United States Patent
Park et al.

(10) Patent No.: US 7,688,420 B2
(45) Date of Patent: Mar. 30, 2010

(54) APPARATUS AND METHOD FOR FABRICATING LIQUID CRYSTAL DISPLAY DEVICE

(75) Inventors: Kil Hoon Park, Gyengsangbuk-do (KR); Jong Ki Park, Daegu-si (KR)

(73) Assignee: LG Display Co., Ltd, Seoul (KR)

( * ) Notice: Subject to any disclaimer, the term of this patent is extended or adjusted under 35 U.S.C. 154(b) by 0 days.

(21) Appl. No.: 11/518,950

(22) Filed: Sep. 12, 2006

(65) Prior Publication Data

US 2007/0002268 A1    Jan. 4, 2007

Related U.S. Application Data

(62) Division of application No. 10/872,407, filed on Jun. 22, 2004, now Pat. No. 7,123,338.

(30) Foreign Application Priority Data

Sep. 9, 2003    (KR) ................ 2003-63090

(51) Int. Cl.
*G02F 1/1339* (2006.01)

(52) U.S. Cl. .................................... 349/190

(58) Field of Classification Search .......... 349/153, 349/190
See application file for complete search history.

(56) References Cited

U.S. PATENT DOCUMENTS

| 6,083,454 | A   | * | 7/2000  | Tang et al. ............... 266/202 |
| 6,220,747 | B1  |   | 4/2001  | Gosselin |
| 6,245,206 | B1  |   | 6/2001  | Anderson et al. |
| 6,245,583 | B1  | * | 6/2001  | Amador et al. .............. 438/14 |
| 6,280,799 | B1  | * | 8/2001  | Okabe et al. ............... 427/466 |
| 6,451,189 | B2  | * | 9/2002  | Anderson et al. .......... 204/462 |
| 6,575,564 | B1  | * | 6/2003  | Tsuchiya et al. ............. 347/70 |
| 6,805,308 | B2  | * | 10/2004 | Kweon et al. ............. 239/583 |
| 6,872,672 | B2  | * | 3/2005  | Yamazaki et al. .......... 438/780 |
| 7,253,866 | B2  | * | 8/2007  | Moon et al. ................ 349/153 |
| 2002/0188196 | A1 | * | 12/2002 | Burbank et al. ............ 600/431 |
| 2002/0197394 | A1 | * | 12/2002 | Yamazaki et al. ............. 427/66 |
| 2004/0122367 | A1 | * | 6/2004  | Sculati ....................... 604/140 |

FOREIGN PATENT DOCUMENTS

| JP | 2000-012572 | 1/2000 |
| KR | 2003-0051398 | 6/2003 |
| KR | 2003-0058055 | 7/2003 |

\* cited by examiner

*Primary Examiner*—James A Dudek
(74) *Attorney, Agent, or Firm*—Morgan Lewis & Bockius LLP

(57) ABSTRACT

An apparatus for fabricating a liquid crystal display device includes a controller for providing nitrogen ($N_2$) gas at a constant pressure, a plurality of dispensers receiving the nitrogen gas from the controller, each of the dispensers dotting a silver paste at two or more regions of a first substrate, and a plurality of flow control valves each introducing the nitrogen gas into each of the plurality of dispensers at the same pressure.

5 Claims, 5 Drawing Sheets

US 7,688,420 B2

APPARATUS AND METHOD FOR FABRICATING LIQUID CRYSTAL DISPLAY DEVICE

This application is a Divisional of U.S. patent application Ser. No. 10/872,407, filed Jun. 22, 2004 now U.S. Pat. No. 7,123,338, and claims the benefit of Korean Patent Application No. 63090/2003, filed in Korea on Sep. 9, 2003, both of which are hereby incorporated by reference in their entirety.

BACKGROUND OF THE INVENTION

1. Field of the Invention

The present invention relates to a liquid crystal display device, and more particularly, to an apparatus for fabricating a liquid crystal display device and a method of fabricating a liquid crystal display device.

2. Description of the Related Art

In general, a process of fabricating a liquid crystal display (LCD) device includes a substrate fabrication process, a cell fabrication process, and a module process. During the substrate fabrication process, a plurality of thin film transistors (TFTs) are fabricated onto a cleaned glass substrate during TFT fabrication processes, and a color filter is fabricated onto a cleaned glass substrate during color filter fabrication processes. During the TFT fabrication processes, the plurality of TFTs and a plurality of pixel electrodes are fabricated on a first substrate. During the color filter fabrication processes, red, green, and blue color filter layers are formed using a dye or pigment, and a common electrode (ITO) is formed on a second substrate upon which a black matrix is formed.

During the cell fabrication process, liquid crystal material is injected between a first substrate and a second substrate, thereby forming an LCD cell panel. Accordingly, the first substrate is provided with the TFTs and the pixel electrodes, and the second substrate is provided with the color filters and the common electrode. Thus, the first substrate and the second substrate are attached to each other with a space therebetween, and the liquid crystal material in injected into the space.

During the module process, a circuit section for processing signals is fabricated, and a module is fabricated by connecting the LCD cell panel with the signal processing circuit section.

The cell fabrication process requires processes for performing grounding to generate a voltage difference between the two substrates according to the electric signals, as well as processes for attaching the first substrate and the second substrate together. These processes are achieved by connecting the common electrode of the second substrate to the first substrate.

The method of manufacturing an LCD according to related art will now be described.

FIG. 1 is a plan view of an LCD panel according to the related art, and FIG. 2 is a cross sectional view along I-I' of FIG. 1 according to the related art. In FIG. 1, an LCD device includes a first substrate 1, a second substrate 2, an active region 12, a sealant 7, and silver pastes 8. The active region 12 includes a plurality of pixel regions 6, which are defined by a plurality of gate lines 3 and a plurality of data lines 5 arranged in a matrix configuration on the first substrate 1. In order to protect the liquid crystal material (not shown) within the active region 12 from damage, the sealant 7 surrounds edges of the active region 12, thereby attaching the first substrate 1 to the second substrate 2. In addition, the silver (Ag) pastes 8 are formed outside the sealant 7. The silver pastes 8 are spaced from each other, and electrically ground the first substrate 1 and the second substrate 2 using silver particles in the silver pastes 8 as a conductive material. The silver pastes 8 include two or more silver pastes formed on the first and second substrates 1 and 2. For example, when the first and second substrates 1 and 2 are small-sized, two silver pastes 8 may be formed at top and bottom corners of the first and second substrates 1 and 2.

In FIG. 2, the LCD device includes a first substrate 1, gate lines (not shown), a gate insulating film 9, a semiconductor layer 10, thin film transistors (not shown), a passivation film 15, pixel electrodes 16, and a first alignment film 17a. Each of the gate lines (not shown) include a gate electrode 4 extending therefrom, and are formed along an inner surface of the first substrate 1. In addition, the gate lines (not shown) are arranged in rows along the inner surface of the first substrate 1, and the gate insulating film 9 is formed along an entire surface of the first substrate 1. The semiconductor layer 10 is formed having an island shape on the gate insulating film 9 at an upper side of the gate electrode 4.

Then, a source electrode 13a and a drain electrode 13b are formed on the semiconductor layer 10, thereby completing the thin film transistor (not shown). Next, the passivation film 15 is formed along the entire surface of the first substrate 1 including the source electrode 13a and the drain electrode 13b. Then, the pixel electrodes 16 are formed on the passivation film 15, and are connected to the drain electrodes 13b. Accordingly, the first alignment film 17a aligns liquid crystal molecules of a liquid crystal material (not shown) disposed between the first and second substrates 1 and 2.

In FIG. 2, the second substrate 2 includes a black matrix 18, a color filter layer 19, a common electrode 21, and a second alignment film 17b. The black matrix 18 is formed along an inner surface of the second substrate 2, and blocks light corresponding to the gate lines 3, the data lines 5, and the thin film transistor (not shown). The color filter layer 19 produces colored light at portions corresponding to the pixel electrodes 16. Then, the common electrode 21 is formed on the black matrix 18 and the color filter layer 19, and generates a voltage difference between the common electrode 21 and the pixel electrode 16 of the first substrate 1. Next, the second alignment film 17b is formed on the common electrode 21 and aligns the liquid crystal molecules of the liquid crystal material (not shown) disposed between the first and second substrates 1 and 2.

The LCD device further includes the liquid crystal material (not shown), spacers 22, a sealant 7, and silver pastes 8. The liquid crystal molecules are aligned by the first and second alignment films 17a and 17b between the first substrate 1 and the second substrate 2, and the spacers 22 are made of plastic material and maintain the space between the first substrate 1 and the second substrate 2. In order to prevent moisture and foreign material from being introduced into the liquid crystal material, the sealant 7 is attached to the edges of the active region 12, as shown in FIG. 1, of the first and second substrates 1 and 2, thereby sealing the active region 12. The silver pastes 8 electrically connect the common electrode to the first substrate at an exterior portion of the sealant 7.

A method of fabricating the above-described LCD panel includes performing a TFT array process on the first substrate 1 and performing a pixel electrode process on the second substrates 2. Then, the spacers 22 are dispersed onto one of the first or second substrates 1 or 2 to maintain a uniform interval between the first substrate 1 and the second substrate 2. Next, the sealant 7, such as thermosetting resin or epoxy resin hardened by ultraviolet, is printed at edges of the active region 12 of the first and second substrates 1 and 2. Then, the silver pastes 8 are formed to connect the common electrode of the second substrate 2, wherein the silver pastes 8 can be formed using a print method including a screen mask or using a dotting method including a dispenser.

During the print method, the screen mask is placed on the second substrate 2 and the silver pastes are printed onto the second substrate 2 including the screen mask. This method is disadvantageous since significant amounts of the silver pastes is wasted.

During the dotting method, the silver pastes are individually formed one-by-one so that the silver pastes 8 may be formed at desired positions using proper amounts of silver.

FIG. 3 is a plan view of a dotting method for fabricating an LCD device according to the related art. In FIG. 3, an LCD device includes a first substrate 1, a plurality of LCD cells 25 formed on the first substrate 1, a sealant 7 surrounding edges of an active region 12 within the LCD cell 25, and silver pastes 8 dotted at an exterior portion of the sealant 7.

A dispenser 24 is used to dot the silver pastes 8 at the desired positions of the first substrate 1 using an extrusion process that includes application of a predetermined pneumatic pressure from a controller (not shown).

During the cell fabrication process, the silver pastes 8 should be formed with a predetermined size and at predetermined interval distances between each of the silver pastes 8 around the sealant 7 of the LCD cell of the second substrate 2 to enhance productivity. However, during the process of dotting the silver pastes, since the controllers for providing pneumatic pressure correspond to the dispensers 24 in a one-to-one relationship, the dispenser 24 should move many times so as to dot the plurality of silver pastes 8 for each of the individual LCD cells. In other words, significant amounts of tacking time is required to manufacture the LCD device.

SUMMARY OF THE INVENTION

Accordingly, the present invention is directed to an apparatus and a method of fabricating an LCD device that substantially obviate one or more problems due to limitations and disadvantages of the related art.

An object of the present invention is to provide an apparatus for supplying dispensers to reduce tacking time.

Another object of the present invention is to provide a method for supplying dispensers to reduce tacking time.

Additional features and advantages of the invention will be set forth in part in the description which follows, and in part will be apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, an apparatus for fabricating a liquid crystal display device includes a controller for providing nitrogen ($N_2$) gas at a constant pressure, a plurality of dispensers receiving the nitrogen gas from the controller, each of the dispensers dotting a silver paste at two or more regions of a first substrate, and a plurality of flow control valves each introducing the nitrogen gas into each of the plurality of dispensers at the same pressure.

In another aspect, a method of fabricating a liquid crystal display device includes preparing a first substrate and a second substrate, the first substrate having a plurality of liquid crystal display cells each comprising a thin film transistor and a pixel electrode, and the second substrate having a color filter layer and a common electrode, coating a plurality of sealants onto the first substrate, each sealant surrounding edges of an active region of each of the plurality of liquid crystal display cells, dispersing a plurality of spacers onto the first substrate, simultaneously dispensing a plurality of silver pastes spaced apart by a predetermined interval distance from each other at an exterior portion of the sealants coated onto the plurality of liquid crystal display cells, and attaching the first substrate to the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
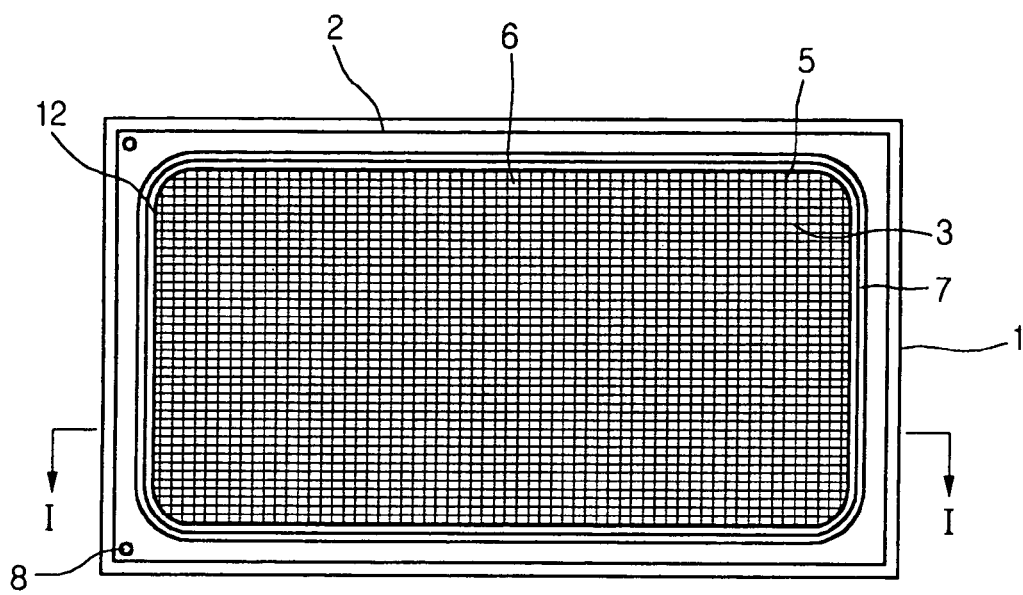
FIG. 1 is a plan view of an LCD panel according to the related art.
Figure 2:
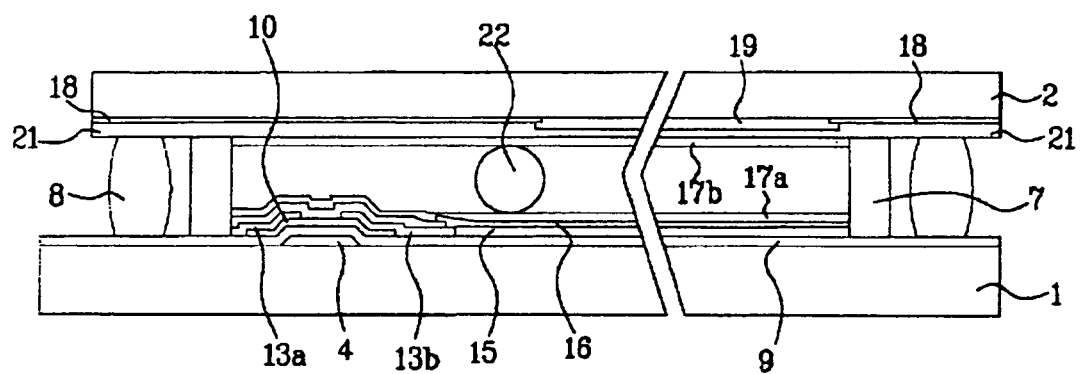
FIG. 2 is a cross sectional view along I-I' of FIG. 1 according to the related art.
Figure 3:
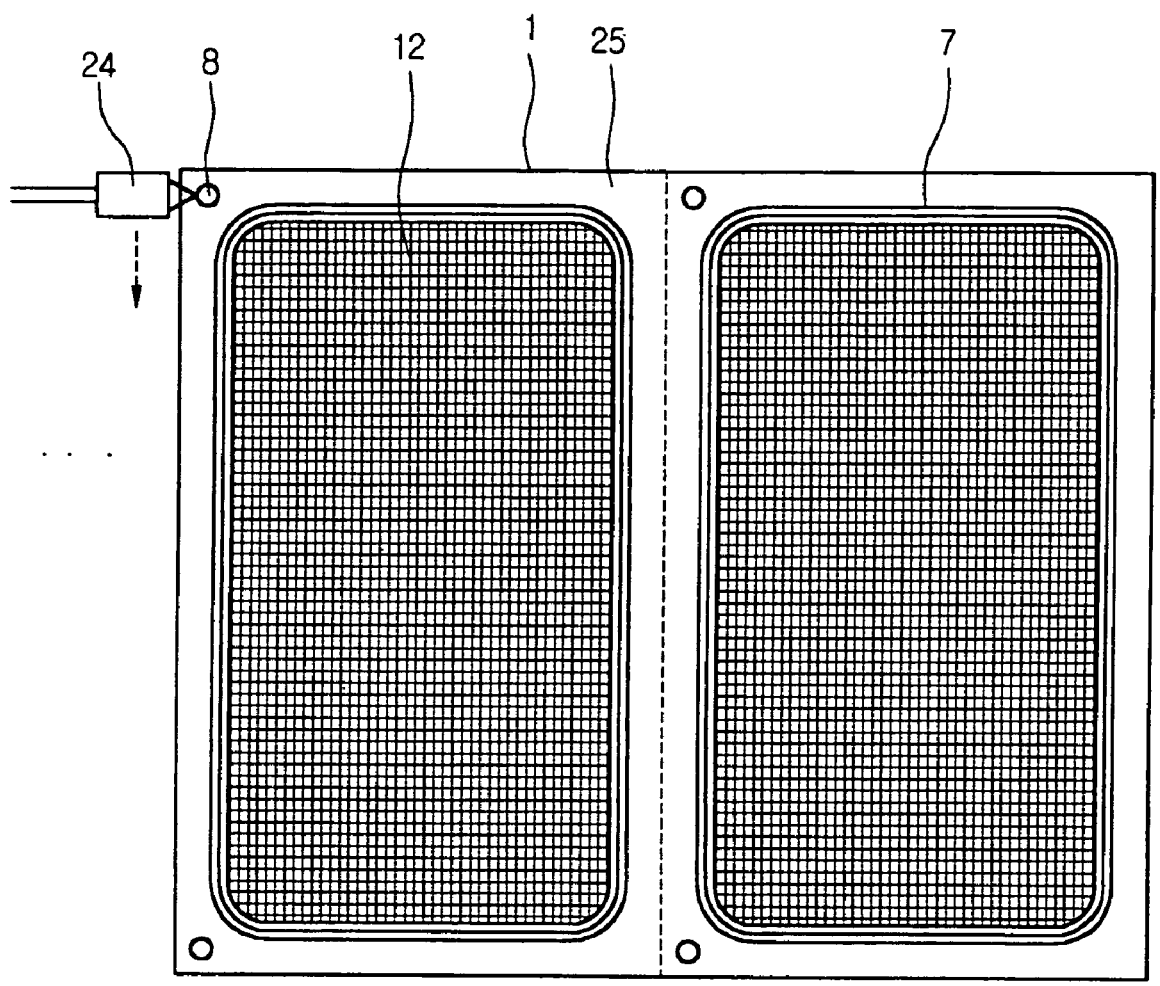
FIG. 3 is a plan view of a dotting method for fabricating an LCD device according to the related art.
Figure 4:
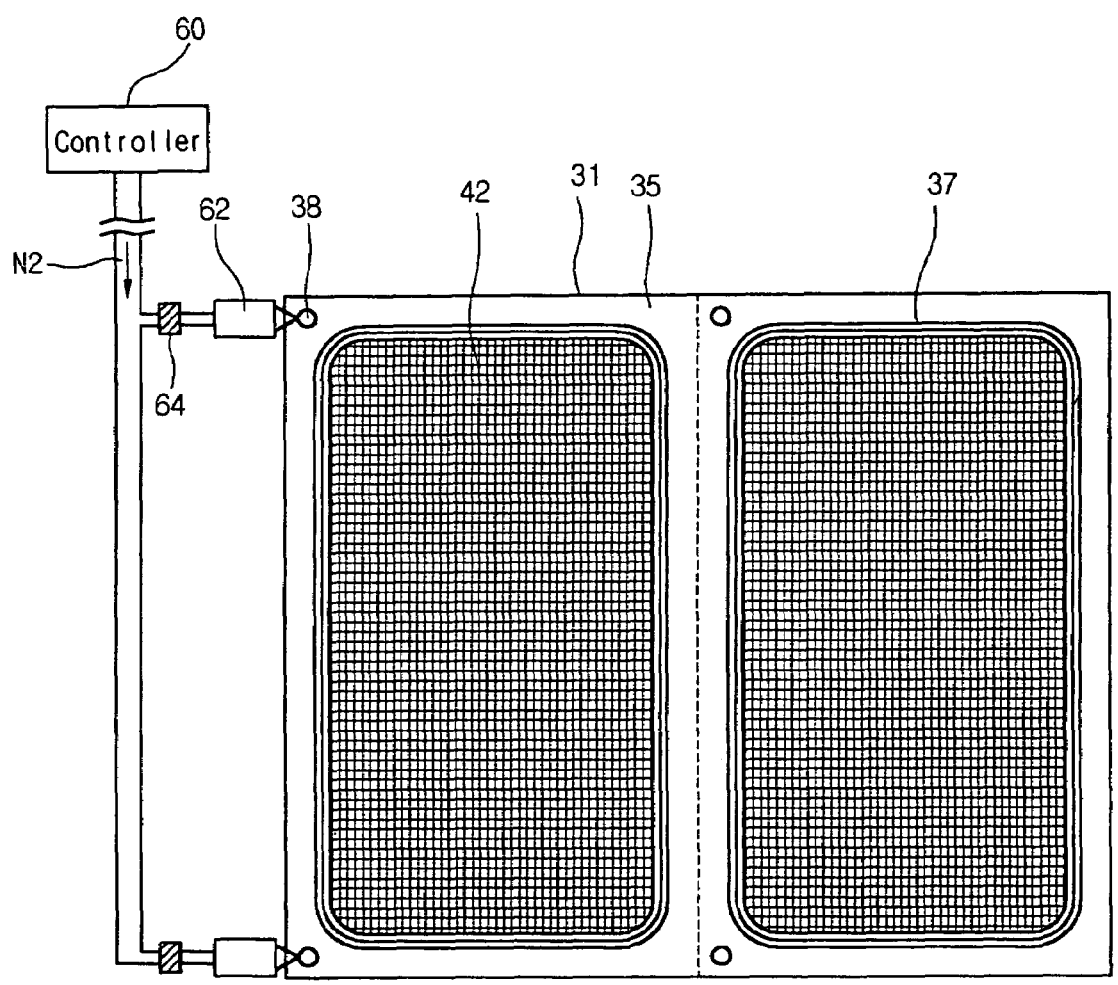
FIG. 4 is a plan view of an exemplary apparatus for fabricating an LCD device according to the present invention.

FIG. 4 is a plan view of an exemplary apparatus for fabricating an LCD device according to the present invention. In FIG. 4, an LCD device may include a first substrate 31, a plurality of LCD cells 35 formed on the first substrate 31, a sealant 37 surrounding the edges of an active region 42 within the LCD cell 35, and silver pastes 38 dotted on a plurality regions at an exterior portion of the sealant 37. The plurality of LCD cells 35 may include TFTs and pixel electrodes, and the active region 42 may correspond to a region upon which the TFT and pixel electrode are formed for displaying images. Accordingly, the silver pastes 38 may be formed to electrically ground a common electrode (not shown) formed on a second substrate (not shown) that may oppose the first substrate 1.

In FIG. 4, an apparatus for manufacturing the LCD may include a controller 60, a plurality of dispensers 62, and a flow control valve 64. The controller 60 may constantly supply the dispensers 62 with a predetermined pressure of nitrogen gas. Accordingly, the plurality of dispensers 62 may provide dots of silver paste on a plurality of regions of the first substrate 1. The flow control valve 64 may control the flow rate of the nitrogen gas to introduce the nitrogen gas into the plurality of dispensers 62 at the same pressure. For example, the predetermined pressure may be pneumatic pressure within a range of about 0.1 MPa to about 1 MPa. Accordingly, the controller 60 may supply the nitrogen gas to a plurality of the dispensers 62, the plurality of dispensers 62 may simultaneously dot a plurality of the silver pastes on a plurality of the LCD cells. As a result, tracking time of the dispensers 62 may be reduced.

In addition, according to the present invention, the plurality of dispensers 62 connected to the same controller 60 for supplying the dispensers 62 with nitrogen gas may be positioned at a plurality of regions where the silver pastes should be dotted, and may be spaced from each other with a predetermined distance. Then, the plurality of dispensers 62 may simultaneously dot the silver pastes by extrusion due to pressure of nitrogen gas, thereby reducing the time to complete the dotting process.

In FIG. 4, each of the dispensers 62 may be provided with a flow control valve 64 to constantly control the flow rate of the nitrogen gas introduced into each of the dispensers 62. As a result, equal amounts of the silver pastes may be dotted.

Figure 5:
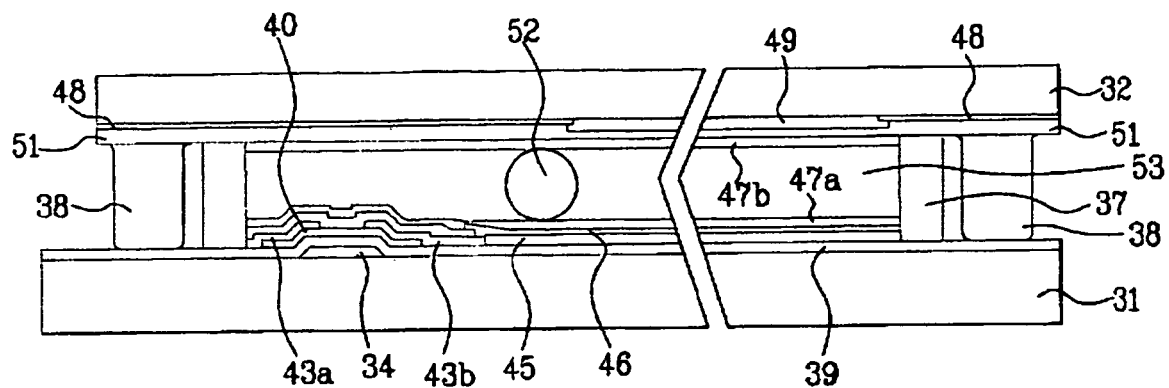
FIG. 5 is a cross sectional view of an exemplary LCD device according to the present invention.
Figure 6:
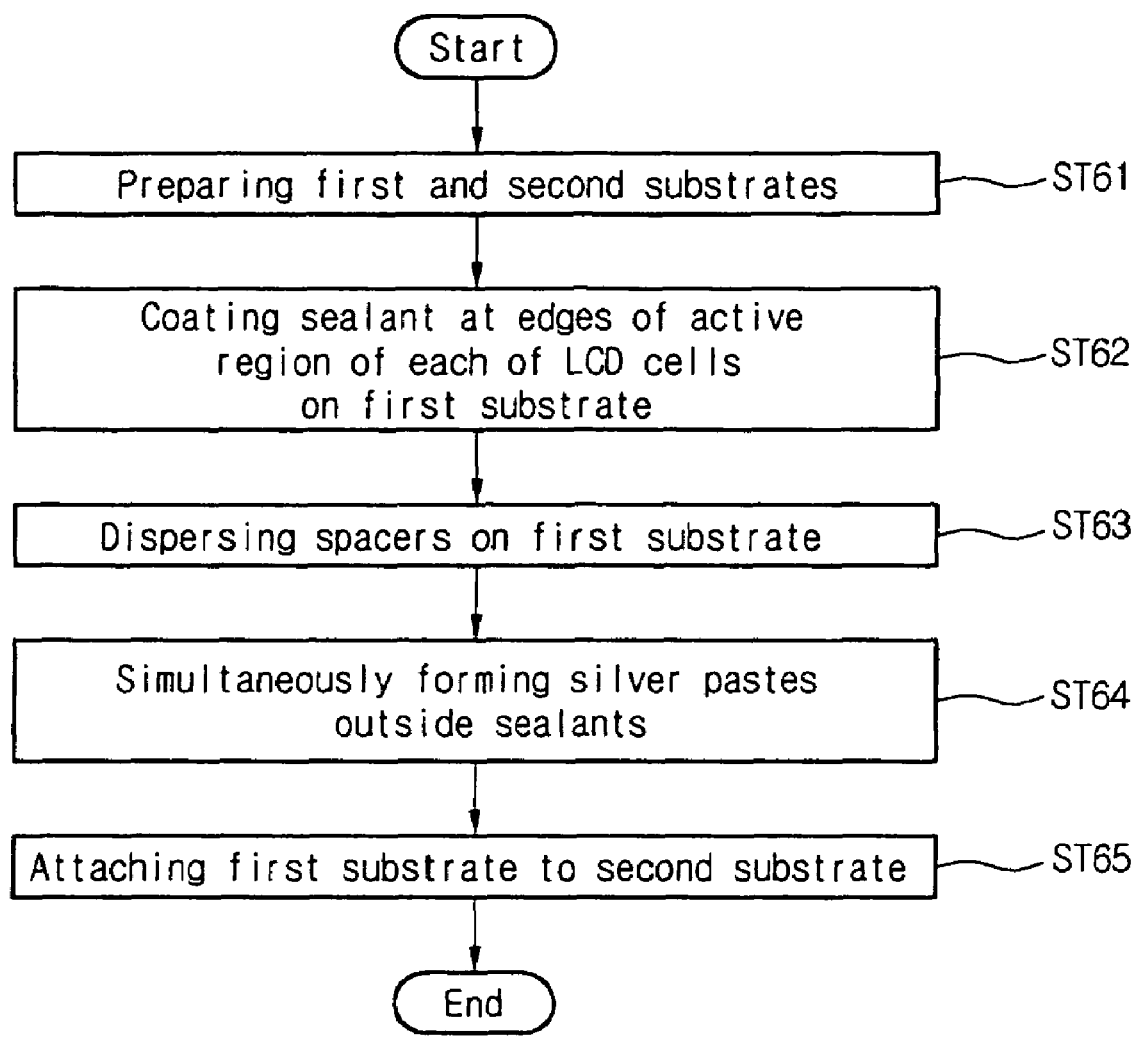
FIG. 6 is a flowchart representing an exemplary method of fabricating an LCD device according the present invention.

FIG. 5 is a cross sectional view of an exemplary LCD device according to the present invention, and FIG. 6 is a flowchart representing an exemplary method of fabricating an LCD device according the present invention. In FIGS. 5 and 6, a method of fabricating an LCD device may include preparing a first substrate 31 and a second substrate 32 (ST61), wherein the first substrate 31 may be provided with a plurality of LCD cells each including a thin film transistors and a pixel electrode and the second substrate 32 may be positioned to face the first substrate 31, and may include a color filter layer and a common electrode.

In FIG. 5, the plurality of LCD cells may be formed on the first substrate 31, and 1 plurality of gate lines (not shown) each including a gate electrode 34 may be formed on the LCD cell. Then, a gate insulating film 39 may be formed to insulate the gate line and the gate electrode 34, and a semiconductor layer 40 may be formed on the gate insulating film 39 corresponding to the gate electrode 34. Next, a source electrode 43a and a drain electrode 43b may be formed at both sides of the semiconductor layer 40 to form a thin film transistor structure.

Then, in order to insulate and planarize a data line (not shown), which may be concurrently formed with the source electrode 43a and the drain electrode 43b, a passivation film 45 may be formed along an entire surface of a resultant structure of the first substrate 31. Then, a pixel electrode (ITO) 46 may be formed on the passivation film 45, and may be connected to the drain electrode 43b. Next, a first alignment film 47a may be formed on the pixel electrode 64.

In FIG. 5, a black matrix 48 for blocking a light from being leaked may be formed at portions corresponding to the gate line, the data line, and the thin film transistor on the second substrate 32. Then, a color filter layer 49 including red, green, and blue unit cells may be formed on a portion corresponding to the pixel electrode 46 between the black matrixes 48. Next, an Indium Tin Oxide (ITO) electrode may be formed as a common electrode 51 on the color filter layer 49 and the black matrix 48 to induce a voltage difference between the common electrode 51 and the pixel electrode 46 driven by the thin film transistor of the first substrate 31. Then, a second alignment film 47b may be formed on an outer surface of the second substrate to provide an orientation of liquid crystal 53.

After the first and second substrates 31 and 32 are prepared, a sealant 37 may be coated on the first substrate 31 so as to surround edges of an active region of each of the plurality of LCD cells 35 (ST62). Then, spacers 52 may be dispersed onto the first substrate 31 to maintain a uniform cell gap between the first substrate 31 and the second substrate 32 (ST63). In addition, the coating the sealant 37 and the dispersing the spacers 52 may be simultaneously performed.

Then, silver pastes 38 may be simultaneously formed that are spaced by a predetermined interval distance from each other at an exterior portion of the sealant 37 coated on the plurality of LCD cells (ST64).

As shown in FIG. 4, the silver pastes 38 may be simultaneously formed using a flow control valve 64 and a plurality of dispensers 62 connected to one controller 60. In other words, the dispensers 62 may be positioned and spaced from each other with a predetermined distance on a plurality of regions where the silver pastes 38 should be dotted, and simultaneously dot equal amounts of silver pastes 38. Consequently, the silver pastes 38 may be dotted by the apparatus for fabricating an LCD device according to the present invention.

In FIGS. 5 and 6, after the sealant 37, the spacers 52, and silver pastes 38 are formed on the first substrate 31, the first substrate 31 may be attached to the second substrate 32 (ST65). Accordigly, before the first substrate 31 is attached to the second substrate 32, liquid crystal material (not shown) may be drop-filled onto the first substrate 31. Alternatively, after the first substrate 31 is attached to the second substrate 32, the liquid crystal material may be injected into the cell gap formed between the first substrate 31 and the second substrate 32.

According to the present invention, tracking time required to fabricate the LCD device may reduced and the silver dots may be of equal amounts.

It will be apparent to those skilled in the art that various modifications and variations can be made in the apparatus and method for fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    preparing a first substrate and a second substrate, the first substrate having a plurality of liquid crystal display cells each comprising a thin film transistor and a pixel electrode, and the second substrate having a color filter layer and a common electrode;
    coating a plurality of sealants onto the first substrate, each sealant surrounding edges of an active region of each of the plurality of liquid crystal display cells;
    dispersing a plurality of spacers onto the first substrate;
    simultaneously dispensing a plurality of silver pastes spaced apart by a predetermined interval distance from each other at an exterior portion of the sealants coated onto the plurality of liquid crystal display cells; and
    attaching the first substrate to the second substrate,
    wherein the silver pastes are dispensed by using an apparatus comprising a single controller for constantly supplying a predetermined pressure of nitrogen ($N_2$) gas; a plurality of dispensers for receiving the nitrogen gas from the controller and dotting the silver paste; and a plurality of flow control valves each introducing the nitrogen gas into each of the plurality of dispensers at the same pressure,
    wherein each of the flow control valves is separately provided to each of the plurality of dispensers, and
    wherein the dispensers dot the silver pastes by extrusion due to the pressure of the nitrogen gas.

2. The method according to claim 1, further comprising dropping liquid crystal material onto the first substrate before the step of attaching the first substrate to the second substrate.

3. The method according to claim 1, further comprising injecting liquid crystal material between the first substrate and the second substrate after the step of attaching the first substrate to the second substrate.

4. The method according to claim 1, wherein the simultaneously dispensing a plurality of silver pastes includes positioning a plurality of dispensers at a plurality of regions where the silver pastes are to be dispensed.

5. The method according to claim 4, wherein each of the dispensers are spaced apart from each other by the predetermined interval distance.

* * * * *